Feb. 28, 1961 C. TOMLINSON 2,972,939
VEHICLE ROOF EXHAUST VENTILATOR
Filed Sept. 25, 1957
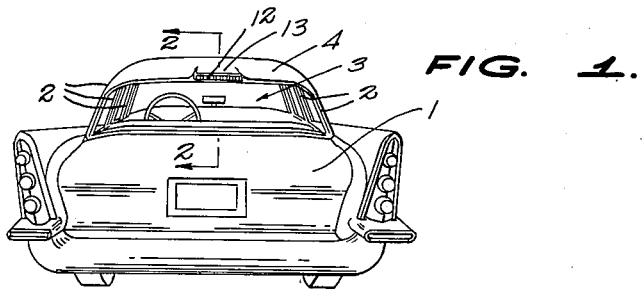
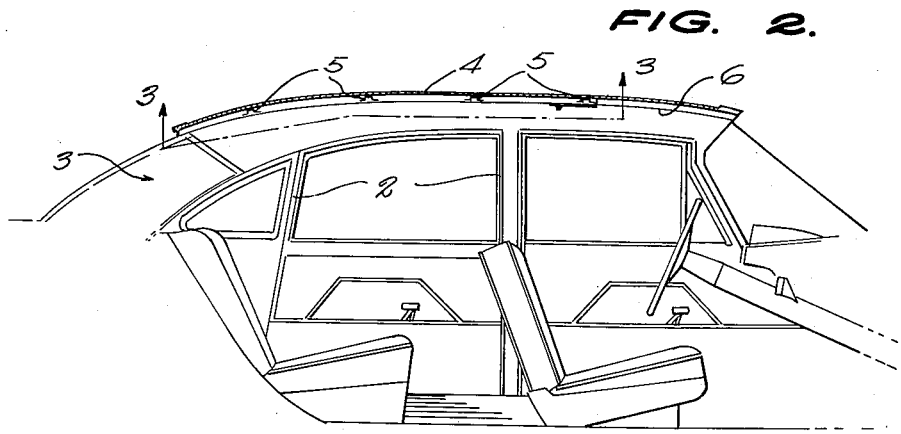
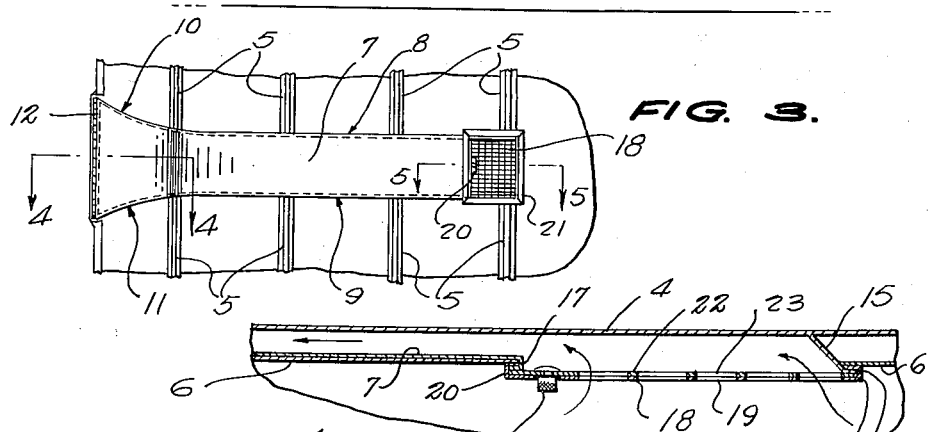
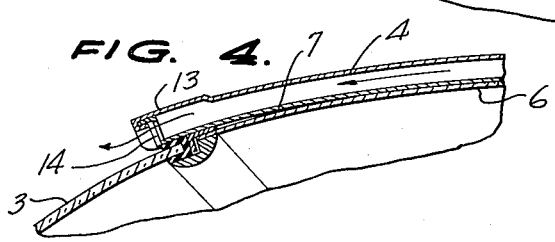
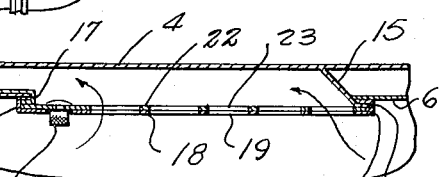
INVENTOR.
CLINTON TOMLINSON,
BY
ATTORNEYS

United States Patent Office 2,972,939
Patented Feb. 28, 1961

2,972,939

VEHICLE ROOF EXHAUST VENTILATOR

Clinton Tomlinson, York, Pa.

Filed Sept. 25, 1957, Ser. No. 686,125

1 Claim. (Cl. 98—2)

The present invention is concerned with a roof structure for motor vehicles and is more particularly directed to a new and improved ventilating roof and the elements forming the same.

The principal object of the present invention is to provide a roof structure for motor vehicles which is more rigid than such structures as presently in use and which provides for the controlled exhaust ventilation of the interior of vehicles incorporating my roof.

A further and important object of the invention is to provide a relatively thin roof structure having interconnected and reinforced lateral ribs for supporting the roof sheathing including a reinforcement member for said ribs and sheathing which will provide means for exhausting air from beneath said roof and thus above the heads of occupants of the vehicle.

Another and equally important object of the invention is to provide an economically producible duct formed by part of the roof sheathing of a vehicle and which duct utilizes air currents passing over the rear portion of said sheathing for effecting a suction in said duct for drawing air from beneath said vehicle roof as the vehicle moves in a forward direction.

Further objects of the present invention will be in part obvious and in part pointed out in the following detailed description of the drawings, wherein:

Fig. 1 is a rear elevation of a vehicle having a car roof in accordance with the present invention.

Fig. 2 is an enlarged longitudinal section of the body of a portion of the vehicle.

Fig. 3 is a sectional view taken on line 3—3 of Fig. 2 of said car roof.

Fig. 4 is a further enlarged detailed cross sectional view taken on line 4—4 of Fig. 3; and Fig. 5 is an enlarged cross sectional detailed view taken on line 5—5 of Fig. 3.

Referring now more particularly to the accompanying drawing wherein like and corresponding parts are designated by similar reference characters, numeral 1 indicates the body of a motor vehicle, the general configuration of which are shown in Fig. 1 is by way of an example only. A plurality of upright posts 2 extend from said body for supporting the top of the car body with the space between said posts providing window areas. A rear window 3 generally formed of glass closes off the space between the rear posts 2, the body 1 and the roof 4 of the vehicle.

Said roof 4 is formed of one sheet of material and accordingly the present invention forms a double function as will be explained hereinafter. A plurality of channel-shaped ribs 5 are positioned beneath said roof 4 for supporting the same and giving it the desired configuration. Said ribs 5 extend laterally of the vehicle with their outer ends fixedly connected to members (not shown) supported by the post 2. A lining 6 extends entirely beneath roof 4 and below said ribs 5 giving a finished appearance to the interior of the vehicle.

The inner ends of at least the rear portion of said ribs 5 are fixedly joined to a duct 7 of a U-shaped cross sectional configuration. Said duct has sides 8 and 9 with the inner ends of ribs 5 connected thereto whereby said duct and said ribs form a unitary structure imparting added rigidity to the vehicle top. The upper ends of sides 8 and 9 of said duct having the roof 4 extending thereacross closing off the open top of said duct and with the roof 4 being supported at its longitudinal central portion thereby.

Sides 8 and 9 of said duct further curve outwardly at their rear end portions 10 and 11 respectively with a plate 12 having a series of openings 14 positioned across the rear end of said duct. Roof 4 has a raised portion 13 pressed therefrom and extending across said rear portion of the duct 7 permitting plate 12 to communicate with the atmosphere at a point directly above rear window 3 of said vehicle.

A plate 15 extends across the forward end of duct 7 closing the same and has a bent end portion 16. Duct 7 has a forward opening formed by L-shaped flange 17 to which is fixedly attached a plate 18 having a series of openings 19 by means of an L-shaped flange 20. Plate 18 further has a front L-shaped flange 21 extending around and mounted upon bent portion 16 of plate 15. A plate 22 having a series of openings 23 is slidably mounted upon plate 18 and controlled by a knob 24 extending through said latter plate for positioning openings 23 in line or out of line with openings 19 as required. Lining 6 is mounted upon flanges 20 and 21 around plate 18 so that only plate 18 is visible within the vehicle.

In the operation of the present device, knob 24 is moved so that the openings 19 and 23 will coincide, placing the interior of duct 7 in communication with the interior of the vehicle body. As the vehicle moves in a forward direction air passes over the roof 4 and around plate 12 downwardly along rear window 3. The air passing over raised portion 13 of said roof accordingly creates a vacuum behind the plate 12 which extends substantially at right angles to said roof and said rear window thereby drawing air in the direction indicated by the arrows in Figs. 4 and 5 from the interior of the vehicle eliminating any undesirable smoke, fumes or the like which may be present therein. The windows of the vehicle may be opened entirely or partially and in some vehicles may be closed entirely depending upon weather conditions.

In addition to the ventilation of the interior of the vehicle provided by the present structure, the fixed jointure of ribs 5 to duct 7 greatly increases the strengthening thereof and also provides a longitudinal support for roof 4 which in turn provides a closure for duct 7 along the top thereof.

The amount of air passing through openings 19 can be varied or discontinued by moving knob 24 and thus moving opening 23 partially or entirely out of alignment with opening 19 as desired.

The present device is capable of considerable modification and such changes thereto as come within the scope of the appended claim, are deemed to be parts of the invention.

What I claim is:

A ventilating vehicle roof structure comprising an elongated relatively shallow channel member of sheet material having a U-shaped cross-sectional configuration providing an open top thereto and an opening in one end portion of the bottom thereof, a vehicle roof sheathing, a plurality of ribs each connected at one end to a side of said member and extending laterally thereof, said sheathing being positioned on said member closing the same and on said ribs with said member extending longitudinally of said roof sheathing, said sheathing having a raised central portion of a U-shaped cross-sectional configuration similar to said member at its edge forming the rear central edge of said roof sheathing, said member extending through and supporting said sheathing raised portion and having a second opening at its opposite end beneath said raised portion edge of said sheathing, a plate extending across and closing said member on a side of said first-mentioned opening opposite to said second opening and means in said member first-mentioned opening for controlling the flow of air therethrough.

References Cited in the file of this patent

UNITED STATES PATENTS

| | | |
|---|---|---|
| 1,804,264 | McDevitt | May 5, 1931 |
| 1,975,958 | Kyle | Oct. 9, 1934 |
| 2,151,097 | Germonprez | Mar. 21, 1939 |
| 2,758,533 | Hill | Aug. 14, 1956 |